Sept. 6, 1927.

G. G. BRADY 1,641,879

PIPE SADDLE

Filed March 6, 1924

G. G. Brady
INVENTOR

BY Victor J. Evans
ATTORNEY

Patented Sept. 6, 1927.

1,641,879

UNITED STATES PATENT OFFICE.

GURDON G. BRADY, OF ARKANSAS CITY, KANSAS.

PIPE SADDLE.

Application filed March 6, 1924. Serial No. 697,378.

My present invention pertains to pipe saddles, and has for its object to provide a pipe saddle that is, at once, susceptible of ready application, and efficient.

To the attainment of the foregoing, the invention consists in the improvement as hereinafter described and definitely claimed.

In the accompanying drawings forming part of this specification:—

Figure 1:
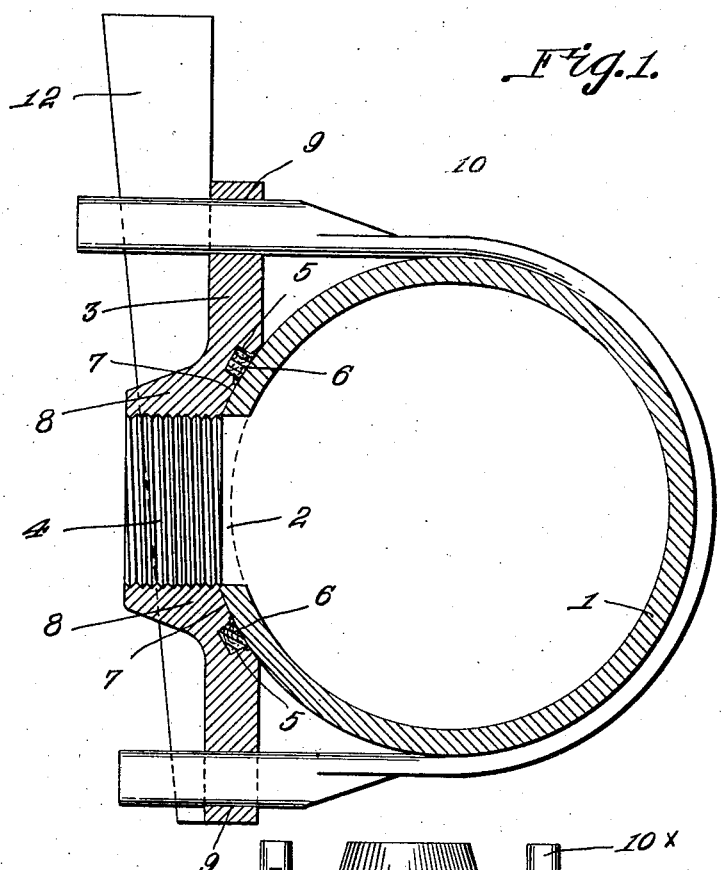
Figure 1 is a view showing a pipe and the body of my novel saddle in section.

Detail reference will first be made to Figure 1.

The pipe 1 illustrated is provided in its wall with an opening 2 and my novel saddle may be utilized for the connection of a branch pipe to the pipe 1 through the said opening 2 or may be used merely to close the opening 2, the body of the saddle in the latter case being, of course, adapted to close the opening 2.

In the illustrated embodiment of my invention the body 3 of the saddle is shown as provided with a threaded opening 4 adapted for arrangement in coincidence with the opening 2. The said body 3 is also provided with an annular channel or seat 5 for the reception of packing 6 which may be of lead, rubber or any other appropriate material. The said packing 6 is carried by the body so as to be applied with the body as a unit, and it is entirely housed within the body so that it is covered thereby when the saddle is in use and is not liable to be casually displaced, and this without interfering in any measure with its efficiency in precluding leakage about the opening 2 of the pipe. The portion of the body 3 opposed to the pipe 1 is concave at 7 to snugly fit the pipe, and the portion of the body in which the threaded aperture 4 is arranged is of increased thickness as designated by 8. It will also be noticed that the body 3 is provided adjacent to its corners with apertures 9.

In addition to the body 3 the saddle comprises two stirrup bolts 10, preferably of circular form in cross-section, of a size to straddle the pipe 1, and provided adjacent to their ends with diametrical slots 11, said slots being of rectangular form in cross-section. The saddle also comprises wedges 12, and in this connection it will be noticed that one of the slots of each bolt 10 is considerably longer than the other to appropriately accommodate the wedge complementary to each bolt.

In the application of my novel saddle the body 3 and the stirrup bolts 10 are arranged as shown in Figure 1 relative to the pipe 1, after which the wedges 12 are inserted in the apertured end portions of the bolts 10 with the wedges in opposed relation to the face of the body 3. When the wedges are thus applied it will be manifest that they will exert simultaneous pressure and it will also be manifest that they are capable of convenient use in close places where wrenches cannot be used. It will further be appreciated that the wedges will serve efficiently in crowing the body 3 and the bolts 10 against a pipe, and yet may be expeditiously and easily applied with the assistance of no tool save a hammer. When it is desired to remove the saddle it is simply necessary to apply hammer blows to the reduced ends of the wedges when the wedges can be readily withdrawn and the body 3 and bolts 10 disassociated and removed.

Figure 2:
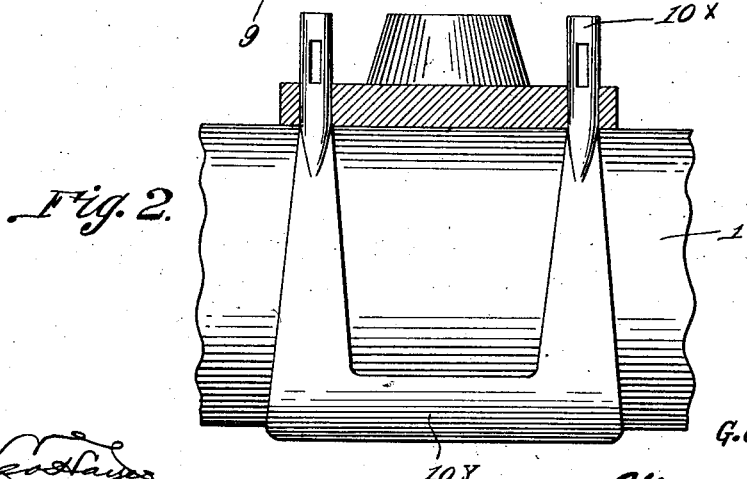
Figure 2 is a side elevation.

In the modification shown in Figure 2, the bolts $10^x$ are in the form of terminals carried by a single stirrup $10^y$ which is adapted to straddle a pipe 1 after the manner illustrated.

In addition to the practical advantages hereinbefore set forth my novel saddle is obviously simple, strong and durable.

I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of parts inasmuch as in the future practice of the invention various changes and modifications may be made such as fall within the scope of my invention as defined in my appended claim.

Having described my invention, what I claim and desire to secure by Letters-Patent, is:—

A pipe saddle consisting in a substantially rectangular shaped body having a curved under portion adapted to fit the contour of a pipe, the inner surface of the curved portion provided with a recess, said recess adapted to carry packing, the said body having a centrally arranged threaded opening and also provided with holes arranged at each corner, a wide strap portion provided with U-shaped ends, the arms of the U-shaped ends being slotted near the extremities of the said arms, wedges engaging the slotted portion of the arms, whereby the arms coming through the holes on opposite sides of the body are engaged simultaneously by the same wedge.

In testimony whereof I affix my signature.

GURDON G. BRADY.